United States Patent
Boyle et al.

(10) Patent No.: US 11,498,616 B2
(45) Date of Patent: Nov. 15, 2022

(54) APPARATUS FOR USE IN TURNING STEERABLE VEHICLE WHEELS

(71) Applicant: TRW Automotive U.S. LLC, Livonia, OH (US)

(72) Inventors: Kevin E. Boyle, Hermitage, TN (US); Ryan L. Noerenberg, West Lafayette, IN (US); Benjamin W. Schoon, Lafayette, IN (US)

(73) Assignee: TRW AUTOMOTIVE U.S. LLC, Livonia, MI (US)

( * ) Notice: Subject to any disclaimer, the term of this patent is extended or adjusted under 35 U.S.C. 154(b) by 917 days.

(21) Appl. No.: 16/294,995

(22) Filed: Mar. 7, 2019

(65) Prior Publication Data
US 2020/0283064 A1   Sep. 10, 2020

(51) Int. Cl.
| | | |
|---|---|---|
| *B62D 6/02* | (2006.01) | |
| *B62D 5/00* | (2006.01) | |
| *B60W 10/08* | (2006.01) | |
| *B62D 5/04* | (2006.01) | |
| *F16H 1/46* | (2006.01) | |
| *F16H 37/08* | (2006.01) | |

(52) U.S. Cl.
CPC .............. *B62D 6/02* (2013.01); *B60W 10/08* (2013.01); *B62D 5/008* (2013.01); *B62D 5/0409* (2013.01); *F16H 1/46* (2013.01); *F16H 37/0826* (2013.01); *B62D 5/0442* (2013.01)

(58) Field of Classification Search
CPC ........ B62D 6/02; B62D 5/008; B62D 5/0409; B62D 5/0442; B62D 5/0424; B62D 5/0427; B62D 3/04; B60W 10/08; F16H 1/46; F16H 37/0826; F16H 37/041; F16H 1/16
See application file for complete search history.

(56) References Cited

U.S. PATENT DOCUMENTS

| | | | | |
|---|---|---|---|---|
| 2014/0353069 | A1* | 12/2014 | Chae | ................ B62D 3/12 180/444 |
| 2018/0244303 | A1* | 8/2018 | Wilske | ................ B62D 5/0421 |

OTHER PUBLICATIONS

Z. Qinchao, W. Xuncheng and L. Fang, "The Overview of Active Front Steering System and the Principle of Changeable Transmission Ratio," 2011 Third International Conference on Measuring Technology and Mechatronics Automation, 2011, pp. 894-897, doi: 10.1109/ICMTMA.2011.795.*

* cited by examiner

*Primary Examiner* — Brian P Sweeney
(74) *Attorney, Agent, or Firm* — Tarolli, Sundheim, Covell & Tummino LLP

(57) ABSTRACT

An apparatus for use in turning steerable vehicle wheels includes a steering column having a pinion connected with a vehicle steering wheel such that rotation of the steering wheel results in rotation of the pinion. An electrically powered steering unit includes an electric motor having a first output shaft rotatable about an axis. A first planetary gear stage has a first gear reduction ratio and is driven by the first output shaft. A second planetary gear stage is driven by the first planetary gear stage and the pinion and has a second gear reduction ratio different from the first gear reduction ratio. A second output shaft is driven by the second planetary gear stage and coupled to the steerable wheels such that rotation of the second output shaft affects steering of the vehicle wheels.

23 Claims, 7 Drawing Sheets

APPARATUS FOR USE IN TURNING STEERABLE VEHICLE WHEELS

TECHNICAL FIELD

The present invention relates to an apparatus for use in turning steerable vehicle wheels.

BACKGROUND OF THE INVENTION

A known vehicle steering apparatus includes a steering member which is linearly movable to effect turning movement of steerable vehicle wheels. A pinion is disposed in meshing engagement with a rack portion of the steering member. A steering column interconnects the pinion and a vehicle steering wheel.

In addition, this known steering apparatus includes a ball nut assembly which is connected with an externally threaded portion of the steering member. A motor is connected with the ball nut assembly. The motor is operable to effect rotation of the ball nut assembly relative to the steering member in order to provide steering assist. A steering apparatus having this general construction is disclosed in U.S. Pat. No. 7,055,646.

SUMMARY OF THE INVENTION

In one example, an apparatus for use in turning steerable vehicle wheels includes a steering column having a pinion connected with a vehicle steering wheel such that rotation of the steering wheel results in rotation of the pinion. An electrically powered steering unit includes an electric motor having a first output shaft rotatable about an axis. A first planetary gear stage has a first gear reduction ratio and is driven by the first output shaft. A second planetary gear stage is driven by the first planetary gear stage and the pinion and has a second gear reduction ratio different from the first gear reduction ratio. A second output shaft is driven by the second planetary gear stage and coupled to the steerable wheels such that rotation of the second output shaft affects steering of the vehicle wheels.

In another example, an apparatus for use in turning steerable vehicle wheels operably connected to a steering wheel by a pinion rotatable by the steering wheel includes an electrically powered steering unit having an electric motor with a first output shaft rotatable about an axis. A gearbox includes a first planetary gear stage having a first gear reduction ratio and driven by the first output shaft. A second planetary gear stage is driven by the first planetary gear stage and the pinion. The second planetary gear stage has a second gear reduction ratio different from the first gear reduction ratio. A second output shaft is driven by the second planetary gear stage and coupled to the steerable wheels such that rotation of the second output shaft affects steering of the vehicle wheels. A controller controls rotation of the first output shaft in response to rotation of the steering wheel.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

Figure 1:
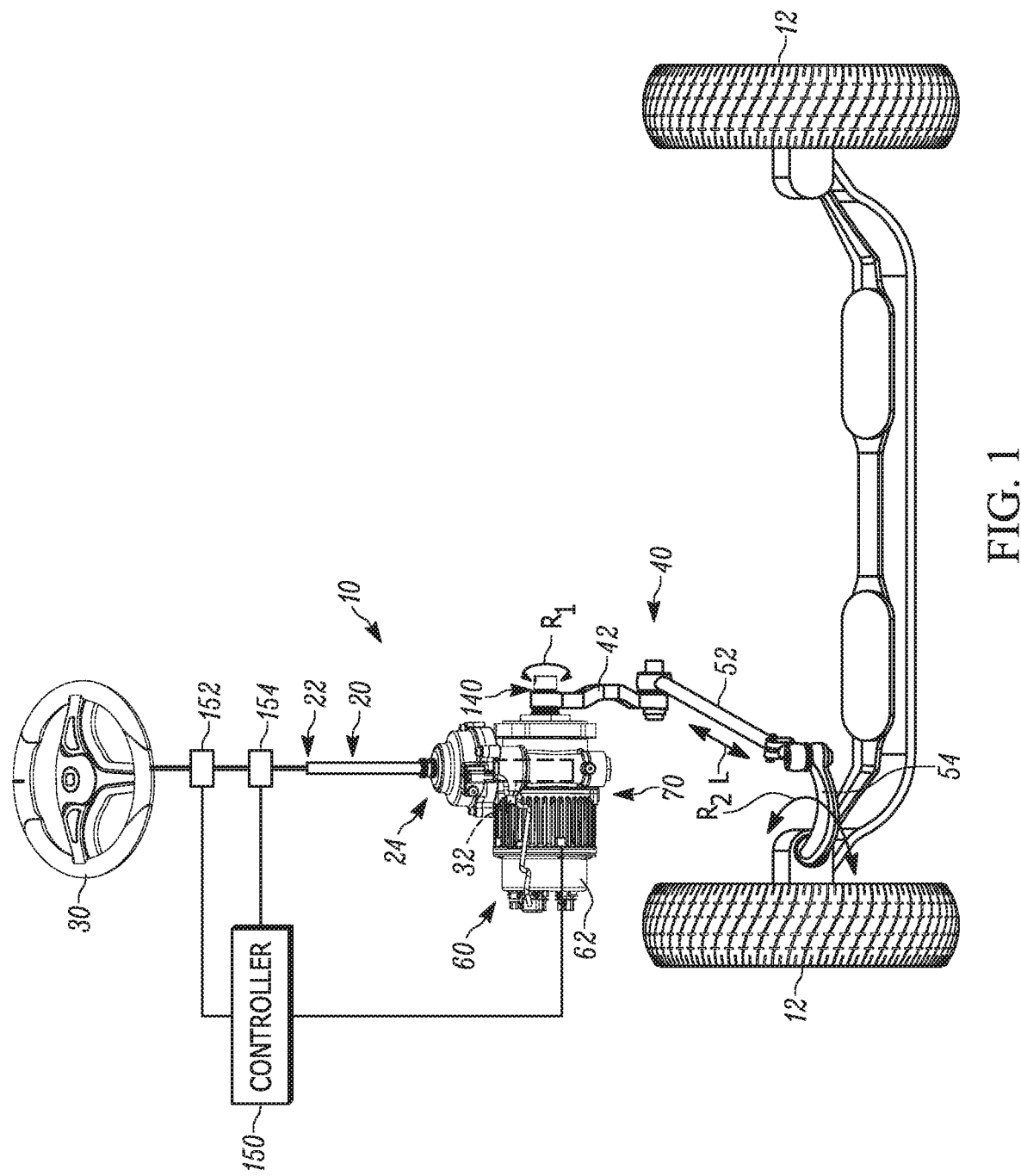
FIG. 1 is a schematic view of an example apparatus for use in turning steerable vehicle wheels.

The present invention relates to an apparatus for use in turning steerable vehicle wheels. An example apparatus 10 for use in turning steerable vehicle wheels 12 is illustrated in FIG. 1. The apparatus 10 can be used in commercial vehicles. The apparatus 10 includes a steering column 20 and an electrically powered steering unit (EPS unit) 60 for providing steering assist. The steering column 20 extends from a first end 22 to a second end 24. A steering wheel 30 is connected to the first end 22. A pinion 32 is connected to or provided on the second end 24. Rotation of the steering wheel 30 transmits force through the steering column 20 to the pinion 32. In other words, the pinion 32 rotates under the influence of force transmitted through the steering column 20.

A steering linkage 40 is connected to the steerable vehicle wheels 12. As shown, the steering linkage 40 includes a first, second, and third steering members 42, 52, 54. The first steering member 42 is connected to an output shaft 140 of the EPS unit 60. The first steering member 42 can be, for example, a pitman arm. The second steering member 52 is connected to the first steering member 42 and can be, for example, a drag link. The third steering member 54 is connected to the second steering member 52 and one of the steerable wheels 12. The third steering member 54 can be, for example, a steering arm.

Figure 2A:
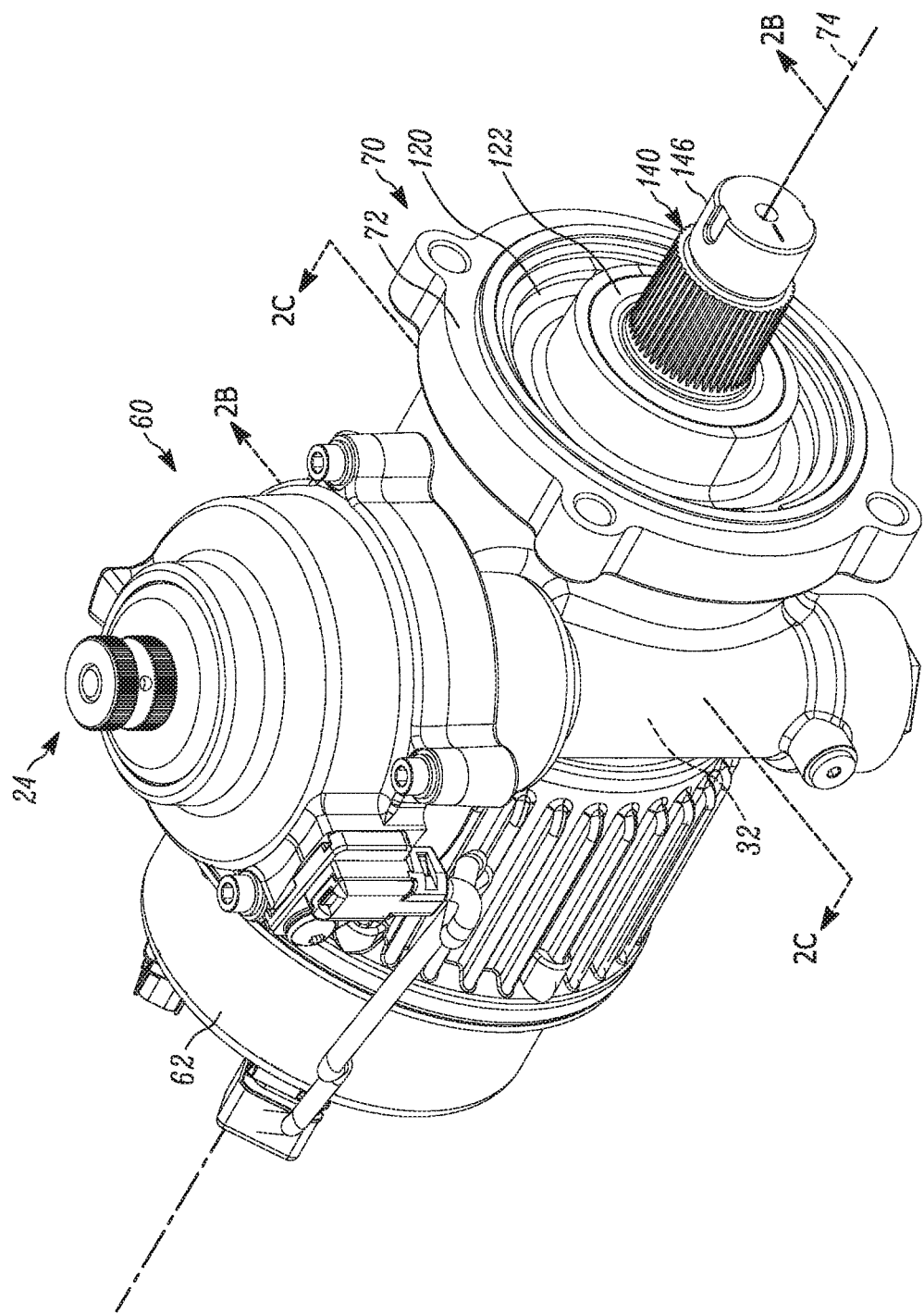
FIG. 2A is a front view of a motor and gearbox of the apparatus of FIG. 1.
Figure 2B:
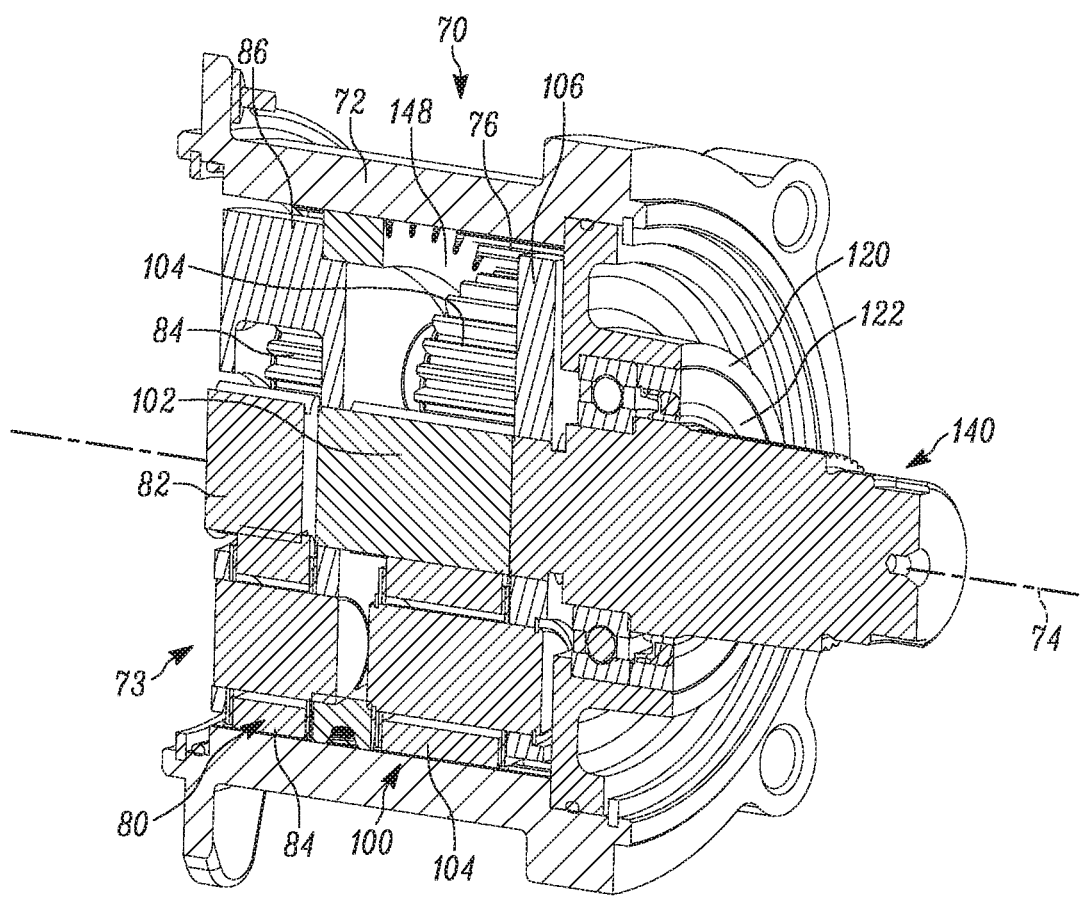
FIG. 2B is a section view taken along line 2B-2B of FIG. 2A.

The EPS unit 60 provides steering assist by affecting movement of the steering linkage 40—and therefore the steerable wheels 12—in response to rotation of the steering wheel 30. Referring further to FIGS. 2A-2B, the EPS unit 60 includes a reversible electric motor 62 and a gearbox 70 connected to the motor. The electric motor 62 has an output shaft 64 (see FIG. 3) that extends into the gearbox 70. The gearbox 70 includes a housing 72 having a passage 73 that extends generally along an axis 74 entirely through the housing. Teeth 76 are provided on the housing 72 along the length of the passage 73 and extend circumferentially about the axis 74.

Figure 2C:
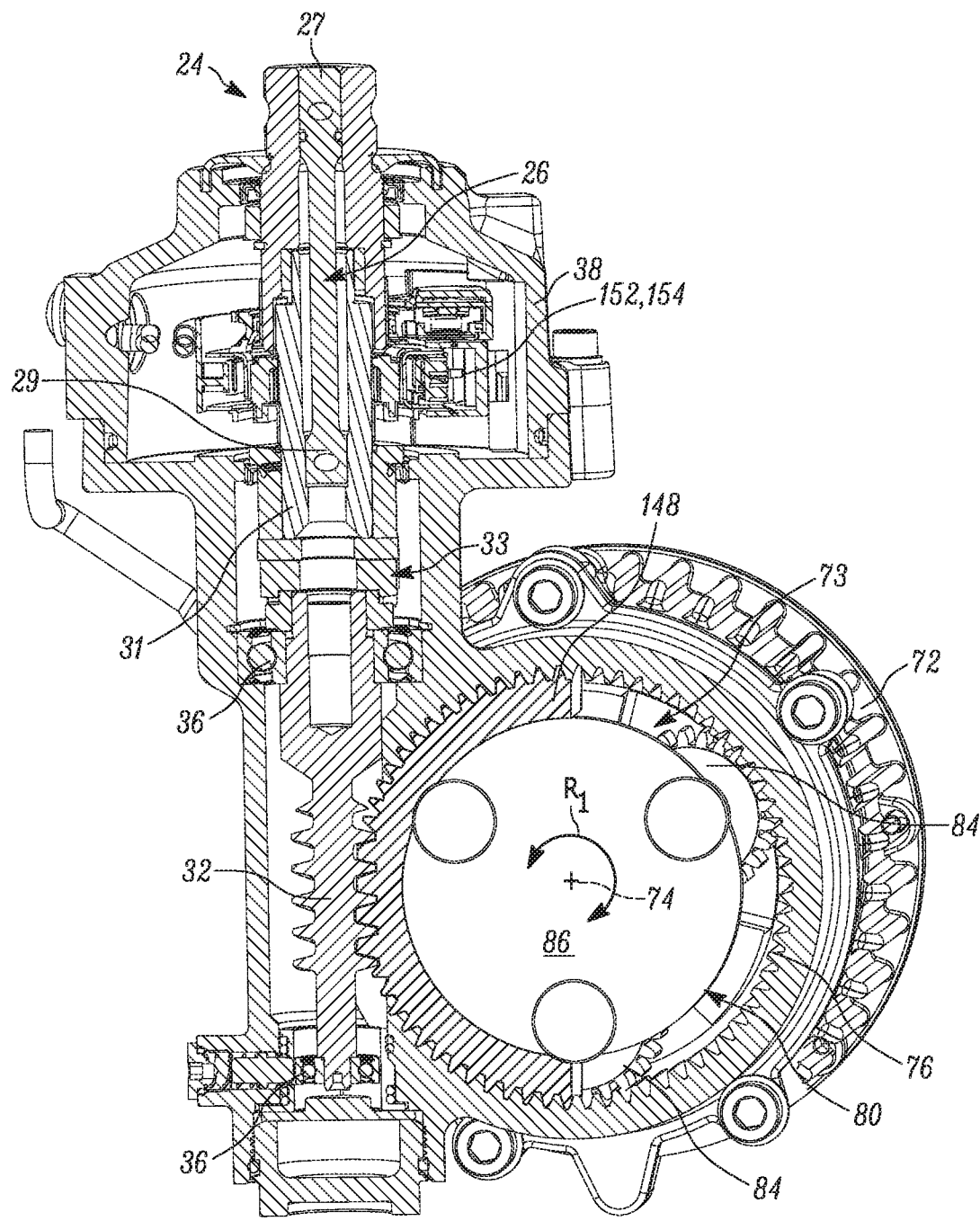
FIG. 2C is a section view taken along line 2C-2C of FIG. 2A with a portion of the gearbox removed for clarity.

As shown in FIG. 2C, the pinion 32 is supported in the housing 72 by a pair of bearings 36. A cap 38 is connected to the housing 72 and receives the second end 24 of the steering column 20 in a manner that allows for relative rotation therebetween. A torsion bar 26, output shaft 31, and coupling 33 help transfer rotation of the of the second end 24 of the steering column 20 (acting as the input shaft) to the pinion 32. The components 24, 26, 31, 32, 33 are coaxial with one another.

The torsion bar 26 extends within the second end 24 of the steering column 20 and the output shaft 31. A first end 27 of the torsion bar 26 is fixed for rotation with the second end 24. A second end 29 of the torsion bar 26 is fixed for rotation with the output shaft 31. When the second end 24 is rotated by the steering wheel 30, the torsion bar 26 permits a prescribed amount of relative rotation between the second end 24 and the output shaft 31 before second end and output shaft rotate together. The coupling 33 is connected to the output shaft 31 for transferring rotation of the output shaft to the pinion 32.

Figure 3:
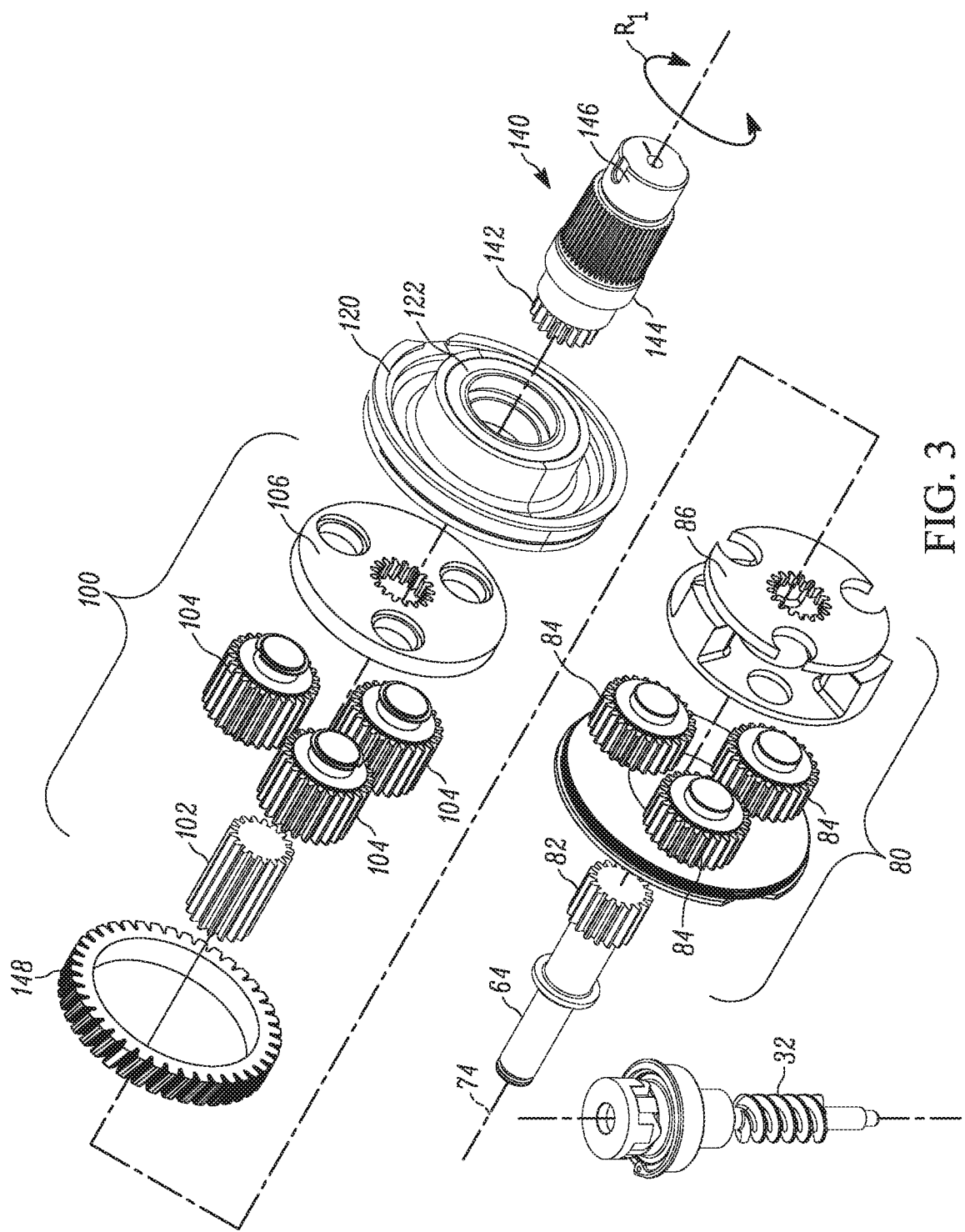
FIG. 3 is an exploded view of a portion of the gearbox of FIG. 2A.

Referring further to FIG. 3, first and second planetary gear stages 80, 100 are positioned within the housing 72 and aligned along the axis 74. The first and second stages 80, 100 are connected in series with one another. The output shaft 64 of the motor 62 extends along the axis 74 towards the first stage 80.

The first planetary gear stage 80 includes a sun gear 82 secured to the output shaft 64 and rotatable therewith. Planetary gears 84 are in meshed engagement with the sun gear 82 and the teeth 76 on the housing 72. Rotating the output shaft 64 in the manner $R_1$ rotates the sun gear 82, causing the planetary gears 84 to rotate and orbit the sun gear while maintaining meshed engagement with the teeth 76. Although three planetary gears 84 are shown, the first planetary gear stage 80 can include more or fewer planetary gears.

The planetary gears 84 are rotatably supported on a carrier 86 that rotates about the axis 74 in the manner $R_1$ as the planetary gears rotate and orbit the sun gear 72. The carrier 86 is radially spaced from the housing 72. The first planetary gear stage 80 can have a gear reduction ratio $r_1$ from the sun gear 82 to the carrier 86 of, for example, about 75:1 to about 500:1.

The second planetary gear stage 100 includes a sun gear 102 secured to the carrier 86 of the first planetary gear stage 80. The sun gear 102 is rotatable with the carrier 86 about the axis 74. Planetary gears 104 are in meshed engagement with the sun gear 102 and the teeth 76 on the housing 72. Rotating the sun gear 102 in the manner $R_1$ causes the planetary gears 104 to rotate and orbit the sun gear while maintaining meshed engagement with the teeth 76. Although three planetary gears 104, are shown the second planetary gear stage 100 can include more or fewer planetary gears.

The planetary gears 104 are rotatably supported on a carrier 106 that rotates about the axis 74 in the manner $R_1$ as the planetary gears rotate and orbit the sun gear 102. The carrier 106 is radially spaced from the housing 72. The second planetary gear stage 100 can have a gear reduction ratio $r_2$ from the sun gear 102 to the carrier 106 of, for example, about 15:1 to about 22:1. It will be appreciated that the gearbox 70 can include additional planetary gear stages (not shown) to achieve a desired gear reduction ratio through the gearbox.

A bushing 120 is connected to the housing 72 and centered about the axis 74 at the end of the passage 73 opposite the motor 62. A bearing 122 is mounted in the bushing 120 and is rotatable about the axis 74 relative to the bushing in the manner $R_1$. An output shaft 140 is mounted in the bearing 122. The output shaft 140 includes a smooth portion 144 fixed to the bearing 122. A splined portion 142 is connected to the carrier 106 of the second planetary gear stage 100 such that the carrier and output shaft 140 rotate together about the axis 74 in the manner $R_1$. The output shaft 140 also includes a projection 146 for connection to the steering linkage 40.

A gear 148 is secured to the carrier 86 of the first planetary gear stage 80 and rotatable therewith in the manner $R_1$. The gear 148 is also in meshed engagement with the pinion 32 (FIG. 2C) on the steering column 30. As a result, rotation of the steering wheel 30 is transferred to the gear 148 by the pinion 32. The pinion 32 and the gear 148 can have a gear reduction ratio $r_3$.

The apparatus 10 (FIG. 1) further includes a controller 150 and one or more vehicle condition sensors that cooperate to control the EPS unit 60 based on sensed vehicle conditions. In one example, the vehicle condition sensors can include a torque sensor 152 and a position sensor 154 connected to the controller 150. The torque sensor 152 senses the torque applied to the steering wheel 30 and generates a signal indicative of the torque. The position sensor 154 senses the rotational position of the steering wheel 30 and generates a signal indicative of the steering wheel position. It will be appreciated that either or both sensors 152, 154 can be positioned inside the cap 38 (see FIG. 2C) or along the steering column 20.

The signals from the torque sensor 152 and the position sensor 154 are sent to the controller 150. The controller 150 analyzes the outputs of the sensors 152, 154 and affects operation of the motor 62 of the EPS unit 60 as a function of the output of the sensors. It is also contemplated that only the torque sensor 152 or only the position sensor 154 can be used to affect operation of the motor 62. The controller 150 can also have inputs which vary as a function of sensed lateral acceleration of the vehicle (not shown) or other vehicle operating conditions. In any case, the signals received by the controller 150 dictate the speed and/or torque of the motor 62 and thereby dictate the speed and torque transferred by the output shaft 64 to the gearbox 70 to assist in turning of the steerable vehicle wheels 12.

During operation, the operator rotates the steering wheel 30 to thereby rotate the pinion 32. This, in turn, rotates the gear 148 about the axis 74 in the manner $R_1$ at a first speed $S_1$ and first torque $T_1$. As noted, the gear reduction ratio $r_3$ dictates the relationship between steering wheel 30 rotation and gear 148 rotation.

At the same time, the controller 150, in response to signals received by at least one of the sensors 152, 154, actuates the motor 62 to rotate the output shaft 64 in the manner $R_1$ with a desired second speed $S_2$ and second torque $T_2$. The second speed $S_2$ of the output shaft 64 is reduced by the gear reduction ratio $r_1$ of the first planetary gear stage 80 to the first speed $S_1$ at the carrier 86. In other words, the controller 150 ensures that the second speed $S_2$ is chosen based on the gear reduction ratio $r_1$ such that the carrier 86 rotates at the same first speed $S_1$ as the input gear 148 secured thereto. The controller 150 therefore coordinates rotation of the output shaft 64 with rotation of the steering wheel 30.

The second torque $T_2$ of the output shaft 64 is increased by the gear reduction ratio $r_1$ to a third torque $T_3$ at the carrier 86. As a result, the sun gear 102 of the second planetary gear stage 100 fixed to the carrier 86 and the input gear 148 rotates at the first speed $S_1$ in the manner $R_1$ with a fourth torque $T_4$ equal to the sum of the first torque $T_1$ and third torque $T_3$.

The first speed $S_1$ of the sun gear 102 is reduced by the gear reduction ratio $r_2$ of the second planetary gear stage 100 to a third speed $S_3$ at the carrier 106. The fourth torque $T_4$ of the sun gear 102 is increased by the gear reduction ratio $r_2$ to a fifth torque $T_5$ at the carrier 106. As a result, the output shaft 140 secured to the carrier 106 rotates at the third speed $S_3$ in the manner $R_1$ with the fifth torque $T_5$.

From the above, it is clear that the first speed $S_1$ delivered by the steering wheel 30 to the gearbox 70 via the pinion 32 is decreased by the product of the gear reduction ratios $r_1$ and $r_3$. The first torque $T_1$ delivered by the steering wheel 30 to the gearbox 70 is increased by the product of the gear reduction ratios $r_1$ and $r_3$. The second speed $S_2$ delivered by the output shaft 64 of the motor 62 to the gearbox 70 is decreased by the product of the gear reduction ratios $r_2$ and $r_3$. The second torque $T_2$ delivered by the output shaft 64 of the motor 62 to the gearbox 70 is increased by the product of the gear reduction ratios $r_2$ and $r_3$. Together, the gear reductions $r_1$-$r_3$ produce the desired third speed $S_3$ and fifth torque $T_5$ at the output shaft 140.

As shown in FIG. 1, when the output shaft 140 rotates in the manner $R_1$ at the third speed $S_3$ and with the fifth torque $T_5$, the first steering member 42 secured thereto likewise rotates in the manner $R_1$ at the third speed and with the fifth torque. The first steering member 42 moves the second steering member 52 in the manner L, which pivots the third steering member 54 in the manner $R_2$ to steer the vehicle wheels 12. The EPS unit 60 therefore relies on the mechanical advantage of the gearbox 70 to reduce the speed of the motor 62 and steering wheel 30 while increasing the torque provided thereby to provide steering assist to the vehicle operator.

Due to this configuration of the gearbox 70 and gear 148, the apparatus 10 is capable of providing feedback or steering feel to the operator. In other words, the gearbox 70 is capable of supplying a relatively lower gear reduction ratio $r_3$ to the steering wheel 30 while simultaneously providing steering assist to the steering linkage 40 through much higher reduction ratios $r_1$, $r_2$. To this end, the gear reduction ratio $r_3$ is configured such that turning of the steering wheel 30 by the operator, e.g., lock-to-lock rotation, is within a predetermined range.

Figure 4:
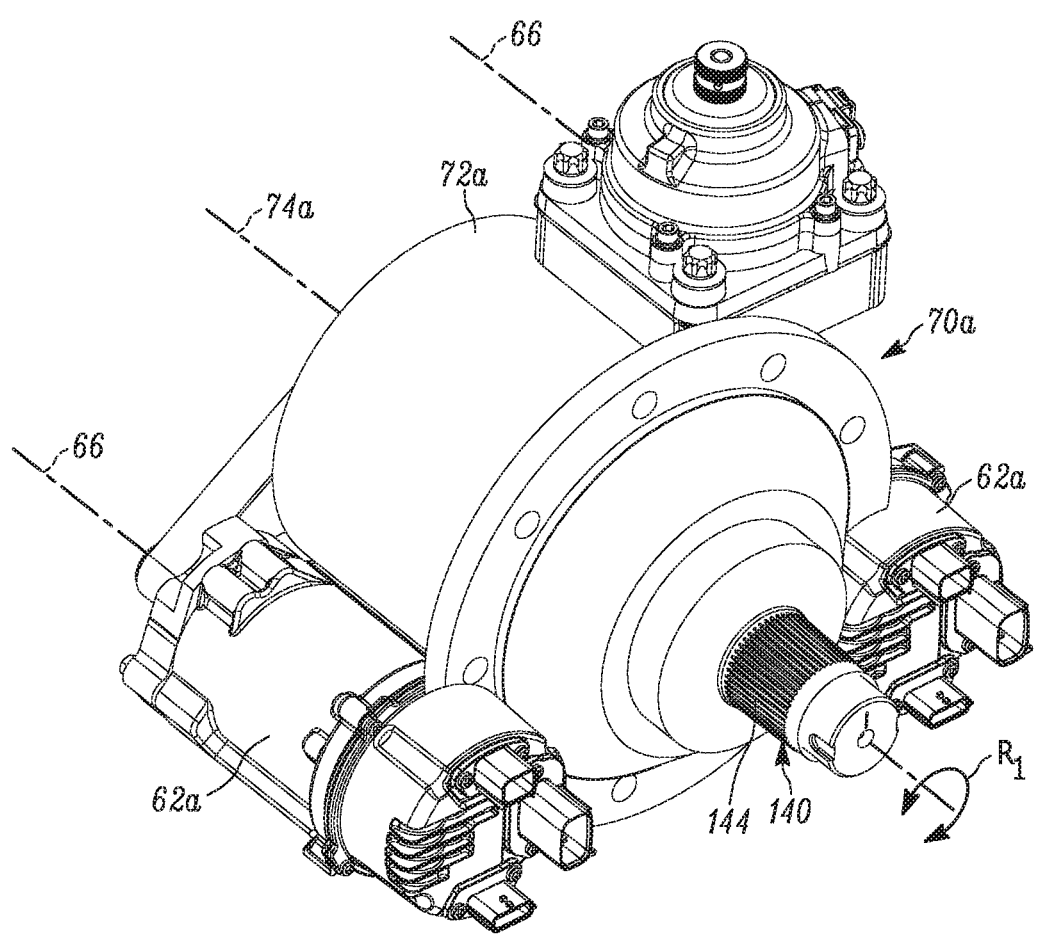
FIG. 4 is a front perspective view of another example motor and gearbox for use in turning steerable vehicle wheels.
Figure 5:
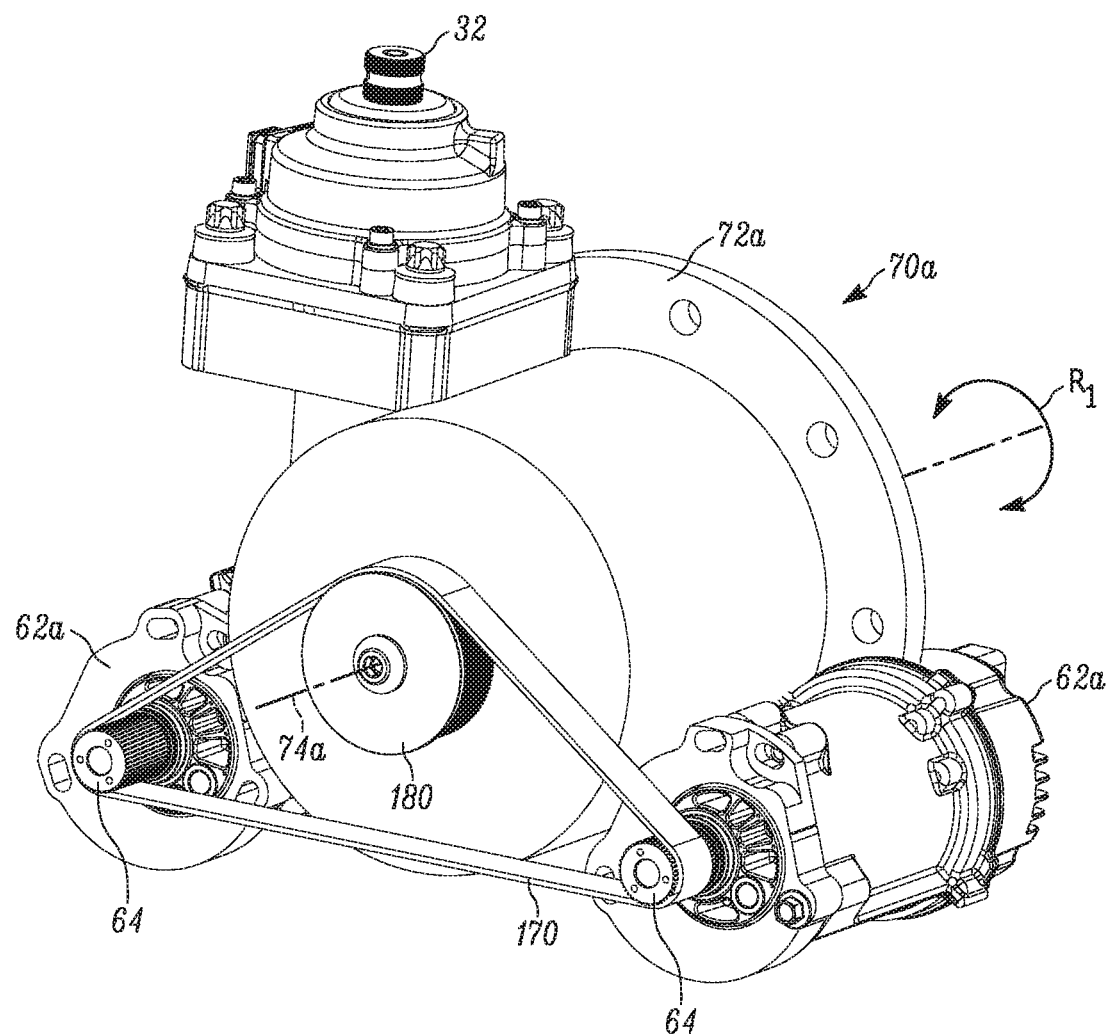
FIG. 5 is a rear perspective view of the motor and gearbox of FIG. 4.

In another example shown in FIGS. 4-5, multiple motors are connected to the gearbox for affecting steering assist of the steerable wheels. Components in FIGS. 4-5 that are identical to the components in FIGS. 1-3 are given the same reference number whereas components that are similar are given the suffix "a".

As shown in FIGS. 4-5, two reversible motors 62a are secured to opposite sides of the housing 72a of the gearbox 70a. The output shaft 64 of each motor 62a is connected to a drive belt 170. The drive belt 170 is connected to an input shaft 180 fixed to the sun gear 82 of the first planetary gear stage 80. When both motors 62a are actuated, the drive belt 170 transmits torque from each motor to the gearbox 70a. It will be appreciated that instead of both motors 62a acting simultaneously one of the motors can be deactivated and used only for redundancy/backup. In any case, the drive belt 170 can have meshed/toothed connections with the output shafts 64 and/or input shaft 180 to help mitigate slippage.

During operation, the operator rotates the steering wheel 30 to thereby rotate the pinion 32. This, in turn, rotates the input gear 148 about the axis 74a in the manner $R_1$ at a first speed $S_1$ and first torque $T_1$. The gear reduction ratio $r_3$ dictates the relationship between steering wheel 30 rotation and input gear 148 rotation.

At the same time, the controller 150, in response to signals received by at least one of the sensors 152, 154, actuates both motors 62a to rotate about respective axes 66 with the second speed $S_2$ and second torque $T_2$. The drive belt 170 transmits both motor 62a rotations to the input shaft 180 such that the input shaft—and the sun gear 82 secured thereto—rotates at the second speed $S_2$ at a sixth torque $T_6$ equal to twice the second torque $T_2$.

The planetary gear stages 80, 100 thereafter cooperate with the sun gear 82 and the gear 148 to adjust the speed and torque thereof as previously described to provide the output shaft 140 with a desired speed and torque for assisting steering of the vehicle wheels 12. More specifically, the second speed $S_2$ of the sun gear 82 is reduced by the gear reduction ratio $r_1$ of the first planetary gear stage 80 to the first speed $S_1$ at the carrier 86. The controller 80 ensures that the second speed $S_2$ is chosen based on the first speed $S_1$ and the gear reduction ratio $r_1$ such that the carrier 86 rotates in the manner $R_1$ at the same first speed $S_1$ as the input gear 148 secured thereto. The controller 80 therefore coordinates rotation of the input shaft 180 with rotation of the steering wheel 30.

The sixth torque $T_6$ of the input shaft 180 is increased by the gear reduction ratio $r_1$ to a seventh torque $T_7$ at the carrier 86. As a result, the sun gear 102 of the second planetary gear stage 100 fixed to the carrier 86 and the input gear 148 rotates at the first speed $S_1$ in the manner $R_1$ with an eighth torque $T_8$ equal to the sum of the sixth torque $T_6$ and seventh torque $T_7$.

The first speed $S_1$ of the sun gear 102 is reduced by the gear reduction ratio $r_2$ of the second planetary gear stage 100 to the third speed $S_3$ at the carrier 106. The eighth torque $T_8$ of the sun gear 102 is increased by the gear reduction ratio $r_2$ to a ninth torque $T_9$ at the carrier 106. As a result, the output shaft 140 secured to the carrier 106 rotates at the third speed $S_3$ in the manner $R_1$ with the ninth torque $T_9$. In one example, the ninth torque $T_9$ associated with the two motor 62a gearbox 70a is greater than the fifth torque $T_5$ associated with the single motor 62 gearbox 70. Consequently, the gearbox 70a is capable of providing steering assist to larger vehicles than gearbox 70.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

Having described the invention, the following is claimed:

1. An apparatus for use in turning steerable vehicle wheels, the apparatus comprising:
   a steering column having a pinion connected with a vehicle steering wheel such that rotation of the steering wheel results in rotation of the pinion;
   an electrically powered steering unit comprising:
      an electric motor having a first output shaft rotatable about an axis;
      a first planetary gear stage having a first gear reduction ratio and driven by the first output shaft;
      a second planetary gear stage driven by the first planetary gear stage and the pinion and having a second gear reduction ratio different from the first gear reduction ratio; and
      a second output shaft driven by the second planetary gear stage and coupled to the steerable vehicle wheels such that rotation of the second output shaft affects steering of the steerable vehicle wheels;
   each of the first and second planetary gear stages including:
      a sun gear rotatable about the axis;
      planetary gears in meshed engagement with the sun gear and orbiting the sun gear while rotating in response to rotation of the sun gear; and
      a carrier connected to the planetary gears and rotatable about the axis;
   wherein a gear is in meshed engagement with the pinion and rotatable with the carrier of the first planetary gear stage for transferring torque from the steering wheel to the carrier of the first planetary gear stage.

2. The apparatus recited in claim 1, wherein the second gear reduction ratio is less than the first gear reduction ratio.

3. The apparatus recited in claim 1, wherein the first gear reduction ratio is 75:1 to 500:1.

4. The apparatus recited in claim 1, wherein the second gear reduction ratio is 15:1 to 22:1.

5. The apparatus recited in claim 1, wherein the first and second planetary gear stages are provided in a housing, and wherein a bearing is connected to the housing and receives the second output shaft.

6. The apparatus recited in claim 1, wherein the first and second planetary gear stages are provided in a housing including teeth for rotatably supporting the first and second planetary gear stages.

7. The apparatus recited in claim 1, wherein the first output shaft of the motor directly drives the first planetary gear stage.

8. The apparatus recited in claim 1 further comprising:
a second motor having an output shaft;
an input shaft coupled to the first planetary gear stage; and
a drive belt connected to the output shafts of the motors and the input shaft for transferring torque from the motors to the input shaft.

9. The apparatus recited in claim 1 further comprising a steering linkage including a first member rotatably connected to the second output shaft, a second member connected to the first member, and a third member connected to the second member and rotatably connected to the vehicle wheels such that rotation of the first member affects steering of the vehicle wheels.

10. The apparatus recited in claim 1 further comprising at least one sensor producing a signal indicative of a vehicle condition and a controller connected with the at least one vehicle condition sensor and the motor, the controller being operable to control rotation of the first output shaft as a function of the signal from the at least one vehicle condition sensor.

11. The apparatus recited in claim 10, wherein the vehicle condition sensor comprises at least one of a torque sensor for sensing a torque applied to the steering wheel and a position sensor for sensing the position of the steering wheel.

12. An apparatus for use in turning steerable vehicle wheels operably connected to a steering wheel by a pinion rotatable by the steering wheel, the apparatus comprising:
an electrically powered steering unit comprising:
an electric motor having a first output shaft rotatable about an axis;
a gearbox including:
a first planetary gear stage having a first gear reduction ratio and driven by the first output shaft;
a second planetary gear stage driven by the first planetary gear stage and the pinion, the second planetary gear stage having a second gear reduction ratio different from the first gear reduction ratio;
a second output shaft driven by the second planetary gear stage and coupled to the steerable vehicle wheels such that rotation of the second output shaft affects steering of the steerable vehicle wheels; and
a controller for controlling rotation of the first output shaft in response to rotation of the steering wheel;
each of the first and second planetary gear stages including:
a sun gear rotatable about the axis;
planetary gears in meshed engagement with the sun gear and orbiting the sun gear while rotating in response to rotation of the sun gear; and
a carrier connected to the planetary gears and rotatable about the axis.

13. The apparatus recited in claim 12, wherein the second gear reduction ratio is less than the first gear reduction ratio.

14. The apparatus recited in claim 12, wherein the first gear reduction ratio is 75:1 to 500:1.

15. The apparatus recited in claim 12, wherein the second gear reduction ratio is 15:1 to 22:1.

16. The apparatus recited in claim 12, wherein the first and second planetary gear stages are provided in a housing, and wherein a bearing is connected to the housing and receives the second output shaft.

17. The apparatus recited in claim 12, wherein the first and second planetary gear stages are provided in a housing including teeth for rotatably supporting the first and second planetary gear stages.

18. The apparatus recited in claim 12, wherein the first output shaft of the motor directly drives the first planetary gear stage.

19. The apparatus recited in claim 12 further comprising:
a second motor having an output shaft;
an input shaft coupled to the first planetary gear stage; and
a drive belt connected to the output shafts of the motors and the input shaft for transferring torque from the motors to the input shaft.

20. The apparatus recited in claim 12 further comprising a gear in meshed engagement with the pinion and rotatable with the carrier of the first planetary gear stage for transferring torque from the steering wheel to the carrier of the first planetary gear stage.

21. The apparatus recited in claim 12 further comprising a steering linkage including a first member rotatably connected to the second output shaft, a second member connected to the first member, and a third member connected to the second member and rotatably connected to the vehicle wheels such that rotation of the first member affects steering of the vehicle wheels.

22. The apparatus recited in claim 12 further comprising at least one sensor producing a signal indicative of a vehicle condition and connected to the controller, the controller being operable to control rotation of the first output shaft as a function of the signal from the at least one vehicle condition sensor.

23. The apparatus recited in claim 22, wherein the vehicle condition sensor comprises at least one a torque sensor for sensing a torque applied to the steering wheel and a position sensor for sensing the position of the steering wheel.

* * * * *